United States Patent
Park et al.

(10) Patent No.: US 9,338,800 B2
(45) Date of Patent: *May 10, 2016

(54) METHOD OF PERFORMING RANDOM ACCESS PROCEDURE IN WIRELESS COMMUNICATION SYSTEM

(71) Applicant: LG Electronics Inc., Seoul (KR)

(72) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/601,021

(22) Filed: Jan. 20, 2015

(65) Prior Publication Data
US 2015/0131633 A1 May 14, 2015

Related U.S. Application Data

(63) Continuation of application No. 13/829,467, filed on Mar. 14, 2013, now Pat. No. 8,971,349, which is a continuation of application No. 12/391,845, filed on Feb. 24, 2009, now Pat. No. 8,837,438.

(60) Provisional application No. 61/031,065, filed on Feb. 25, 2008.

(30) Foreign Application Priority Data

Mar. 14, 2008 (KR) .................. 10-2008-0023808

(51) Int. Cl.
*H04J 3/00* (2006.01)
*H04W 74/08* (2009.01)
(Continued)

(52) U.S. Cl.
CPC ...... *H04W 74/0833* (2013.01); *H04W 72/0446* (2013.01); *H04W 74/004* (2013.01); *H04W 92/20* (2013.01)

(58) Field of Classification Search
CPC .......... H04W 74/0833; H04W 74/004; H04W 72/04; H04W 92/20; H04W 72/0446
See application file for complete search history.

(56) References Cited

U.S. PATENT DOCUMENTS 6,795,412 B1 9/2004 Lee
7,302,251 B2 11/2007 Barany et al.
(Continued)

FOREIGN PATENT DOCUMENTS

JP 2004-40729 A 2/2004
WO WO 2005/107101 A1 11/2005
WO WO 2007/147431 A1 12/2007

OTHER PUBLICATIONS

3GPP, "E-UTRA MAC protocol specification (Release 8)", 3GPP TS 36.321 V2.0.0, Nov. 2007.

(Continued)

*Primary Examiner* — Brian O'Connor
(74) *Attorney, Agent, or Firm* — Birch, Stewart, Kolasch & Birch, LLP

(57) ABSTRACT

A method of performing contention resolution associated with a random access procedure. The method according to one embodiment includes transmitting, by the mobile communication terminal, an uplink message containing a cell-radio network temporary identity (C-RNTI) and starting a contention resolution timer; receiving, by the mobile communication terminal, a physical downlink control channel (PDCCH) transmission; and considering, by the mobile communication terminal, a contention resolution successful and stopping the contention resolution timer if a specific condition is satisfied. The mobile communication terminal considers the contention resolution successful and stops the contention resolution timer if the PDCCH transmission is addressed to the C-RNTI and the random access procedure is initiated by a downlink (DL) data arrival. The mobile communication terminal considers the contention resolution successful and stops the contention resolution timer if the PDCCH transmission is addressed to the C-RNTI and contains an uplink (UL) grant.

8 Claims, 10 Drawing Sheets

(51) Int. Cl.
*H04W 72/04* (2009.01)
*H04W 74/00* (2009.01)
*H04W 92/20* (2009.01)

(56) References Cited

U.S. PATENT DOCUMENTS

| | | |
|---|---|---|
| 7,302,257 B2 | 11/2007 | Taketsugu |
| 7,406,063 B2 | 7/2008 | Jung et al. |
| 7,843,895 B2 | 11/2010 | Park et al. |
| 7,848,346 B2 | 12/2010 | Park et al. |
| 7,881,236 B2 | 2/2011 | Park et al. |
| 7,881,724 B2 | 2/2011 | Park et al. |
| 7,907,962 B2 | 3/2011 | Shoji |
| 7,957,298 B2 | 6/2011 | Yi et al. |
| 7,961,680 B2 | 6/2011 | Park et al. |
| 7,979,769 B2 | 7/2011 | Chun et al. |
| 8,027,356 B2 | 9/2011 | Lee et al. |
| 8,031,668 B2 | 10/2011 | Wang et al. |
| 8,040,913 B2 | 10/2011 | Lee et al. |
| 8,085,724 B2 | 12/2011 | Imamura et al. |
| 8,090,382 B2 | 1/2012 | Park et al. |
| 8,094,618 B2 | 1/2012 | Yi et al. |
| 8,107,456 B2 | 1/2012 | Park et al. |
| 8,116,778 B2 | 2/2012 | Lee |
| 8,169,992 B2 | 5/2012 | Parkvall et al. |
| 8,170,570 B2 | 5/2012 | Park et al. |
| 8,175,052 B2 | 5/2012 | Lee et al. |
| 8,180,058 B2 | 5/2012 | Kitazoe |
| 8,199,730 B2 | 6/2012 | Ou et al. |
| 8,228,827 B2 | 7/2012 | Jeong et al. |
| 8,274,969 B2 | 9/2012 | Wu |
| 8,295,243 B2 | 10/2012 | Malladi et al. |
| 8,374,144 B2 | 2/2013 | Park et al. |
| 8,374,150 B2 | 2/2013 | Kitazoe |
| 8,396,081 B2 | 3/2013 | Aoyama et al. |
| 8,477,634 B2 | 7/2013 | Yi et al. |
| 8,488,620 B2 | 7/2013 | Cho et al. |
| 8,649,366 B2 | 2/2014 | Park et al. |
| 8,665,857 B2 | 3/2014 | Meylan |
| 8,687,577 B2 | 4/2014 | Yi et al. |
| 8,837,438 B2 * | 9/2014 | Park .................. H04W 74/0833 370/336 |
| 8,971,349 B2 * | 3/2015 | Park .................. H04W 74/0833 370/336 |
| 2002/0065081 A1 | 5/2002 | Barany et al. |
| 2004/0005888 A1 | 1/2004 | Taketsugu |
| 2005/0249118 A1 | 11/2005 | Terry et al. |
| 2007/0213214 A1 | 9/2007 | Roth et al. |
| 2007/0254656 A1 | 11/2007 | Dalsgaard |
| 2008/0102875 A1 | 5/2008 | Shoji |
| 2008/0259900 A1 | 10/2008 | Masuda |
| 2008/0273610 A1 | 11/2008 | Malladi et al. |
| 2008/0310396 A1 | 12/2008 | Park et al. |
| 2009/0041240 A1 | 2/2009 | Parkvall et al. |
| 2009/0143074 A1 | 6/2009 | Pelletier et al. |
| 2009/0190572 A1 | 7/2009 | Chang |
| 2010/0027511 A1 | 2/2010 | Terry |
| 2010/0034162 A1 | 2/2010 | Ou et al. |
| 2010/0093386 A1 | 4/2010 | Damnjanovic et al. |

OTHER PUBLICATIONS

LG Electronics, Inc., "Issues with scheduling request procedure," 3GPP TSG-RAN WG2 #61, R2-081083, Sorrento, Italy, Feb. 11-15, 2008, pp. 1-4.

MAC Rapporteurs (Qualcomm Europe, Ericsson), "E-UTRA MAC protocol specification update", 3GPP TSG-RAN2 Meeting #61, R2-081389, Feb. 11-15, 2008, p. 1-25.

Nokia Siemens Networks, "Update on Security, System Information, Mobility, MBMS and DRX", 3GPP TSG-RAN2 Meeting #59, R2-073863, Jun. 20-24, 2007, p. 1-94.

NTT DoCoMo, Inc., "Summary of email discussion on handover failure handling," 3GPP TSG RAN WG2 #61, Tdoc-R2-081231, Sorrento, Italy, Feb. 11-15, 2008, pp. 1-11.

Panasonic, "Change Request for content resolution in 36.321", RP-080162, Mar. 4-7, 2008.

QUALCOMM Europe, "Random access procedure options," 3GPP TSG-RAN WG2 #56, R2-063278, Riga, Latvia, Nov. 6-10, 2006, pp. 1-6.

* cited by examiner

METHOD OF PERFORMING RANDOM ACCESS PROCEDURE IN WIRELESS COMMUNICATION SYSTEM

CROSS REFERENCE TO RELATED APPLICATIONS

This application is a continuation of co-pending U.S. patent application Ser. No. 13/829,467, filed on Mar. 14, 2013, which is a continuation of U.S. patent application Ser. No. 12/391,845 (which was granted as U.S. Pat. No. 8,837,438 on Sep. 16, 2014), filed on Feb. 24, 2009, which claims the benefit of priority under 35 U.S.C. §119(e) of U.S. Provisional Application No. 61/031,065, filed on Feb. 25, 2008, and under 35 U.S.C. §119(a) to Korean Patent Application No. 10-2008-0023808, filed on Mar. 14, 2008, all of which are hereby expressly incorporated by reference into the present application.

BACKGROUND OF THE INVENTION

1. Technical Field

The present invention relates to wireless communications, and more particularly, to a method of performing random access in a wireless communication system.

2. Background Art

Third generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future. Reduction of cost per bit, increase of service availability, flexible use of frequency bands, simple structure and open interface, proper power consumption of a user equipment (UE), and the like are defined as requirements.

In general, there are one or more cells within the coverage of a base station (BS). One cell may include a plurality of UEs. A UE generally performs a random access procedure to access a network. Examples of the purposes of performing the random access procedure on the network by the UE include (1) initial access, (2) handover, (3) scheduling request, and (4) timing synchronization. These examples are only examples and thus the purposes of performing the random access procedure may vary according to a system in terms of content or the number of times of performing the procedure.

The random access procedure can be classified into a contention based random access procedure and a non-contention based random access procedure. A greatest difference between the contention based random access procedure and the non-contention based random access procedure lies in whether a random access preamble is dedicatedly assigned to one UE. In the non-contention based random access procedure, the UE uses only the random access preamble dedicatedly assigned to the UE itself, and thus contention with another UE does not occur. The contention (or collision) occurs when two or more UEs attempt the random access procedure by using the same random access preamble through the same resource. In the contention based random access procedure, there is a possibility of collision since the UEs use a random access preamble randomly selected from a plurality of candidate random access preambles.

Contention resolution is required when contention occurs in the contention-based random access procedure. In general, a timer is used for contention resolution. It is determined that contention is successful if the timer starts in the random access procedure and if a control signal is successfully received from the BS before the timer expires.

However, since various types of control signals are generally transmitted from the BS to the UE, contention resolution may be incorrectly achieved when unintentional control signals are received before the timer expires. In this case, even if the random access procedure fails, the UE may determine that the random access procedure is successful. This may result in that the UE performs incorrect uplink transmission, which leads to service delay or interference to other UEs.

The present invention provides a method capable of preventing contention between user equipments while a contention-based random access procedure is performed.

SUMMARY OF THE INVENTION

According to an aspect of the invention, there is method of performing contention resolution between a mobile communication terminal and a base station. The method includes initiating a random access procedure by a medium access control (MAC) layer of the mobile communication terminal, including starting a contention resolution timer; and stopping the contention resolution timer and determining that the random access procedure was successfully completed upon receipt from the base station of a physical downlink control channel (PDCCH) transmission addressed to a cell-radio network temporary identity (C-RNTI) of the mobile communication terminal and containing a UL grant.

In another aspect, the contention resolution timer is not stopped upon receipt of a PDCCH transmission addressed to the C-RNTI and not containing the UL grant.

In another aspect, the random access procedure is not considered to be successful upon receipt of a PDCCH transmission addressed to the C-RNTI and not containing the UL grant.

In another aspect, the method includes transmitting a random access preamble to the base station; and receiving a random access response from the base station.

In another aspect, the step of initiating a random access procedure by a medium access control (MAC) layer of the mobile communication terminal includes transmitting a scheduling message from the mobile communication terminal to the base station.

In another aspect, the step of transmitting a scheduling message includes transmitting a buffer status report (BSR) to request an uplink radio resource.

In another aspect, the BSR indicates that there exists data in a buffer of the mobile communications terminal that is ready to be transmitted.

In another aspect, the BSR includes a cell identifier of the mobile communication terminal.

In another aspect, there is a mobile communication terminal that includes a display; a transceiver; and a processor operatively connected to the display and transceiver, the processor including a contention resolution timer. The processor is configured to initiate a random access procedure from a medium access control (MAC) layer of the mobile communication terminal, the random access procedure including starting the contention resolution timer; and stop the contention resolution timer and determine that the random access procedure was successfully completed upon receipt of a physical downlink control channel (PDCCH) transmission addressed to a cell-radio network temporary identity (C-RNTI) of the mobile communication terminal and containing a UL grant.

In another aspect, the processor is configured to not stop the contention resolution timer upon receipt of a PDCCH transmission addressed to the C-RNTI and not containing the UL grant.

In another aspect, the processor is configured to not consider the random access procedure to be successful upon receipt of a PDCCH transmission addressed to the C-RNTI and not containing the UL grant.

In another aspect, the processor is configured to transmit a random access preamble to the base station, and receive a random access response from the base station.

In another aspect, the processor is configured to transmit a scheduling message to the base station when initiating the random access procedure.

In another aspect, the processor is configured to initiate the random access procedure by transmitting a scheduling message to the base station.

In another aspect, the mobile communications terminal includes a buffer, and the processor is configured to initiate the random access procedure by transmitting a buffer status report (BSR) to request an uplink radio resource as the scheduling message.

In another aspect, the BSR indicates that there exists data in the buffer that is ready to be transmitted.

In another aspect, the BSR includes a cell identifier of the mobile communication terminal.

Since a control signal used for contention resolution is defined by considering a situation while a contention-based random access procedure is performed, it is possible to prevent a case where a user equipment incorrectly determines a contention result when unintentional control signals are received. Further, it is possible to solve problems in which interference to another UE occurs due to incorrect contention resolution and in which a service is delayed due to error recovery.

DETAILED DESCRIPTION OF THE INVENTION

Figure 1:
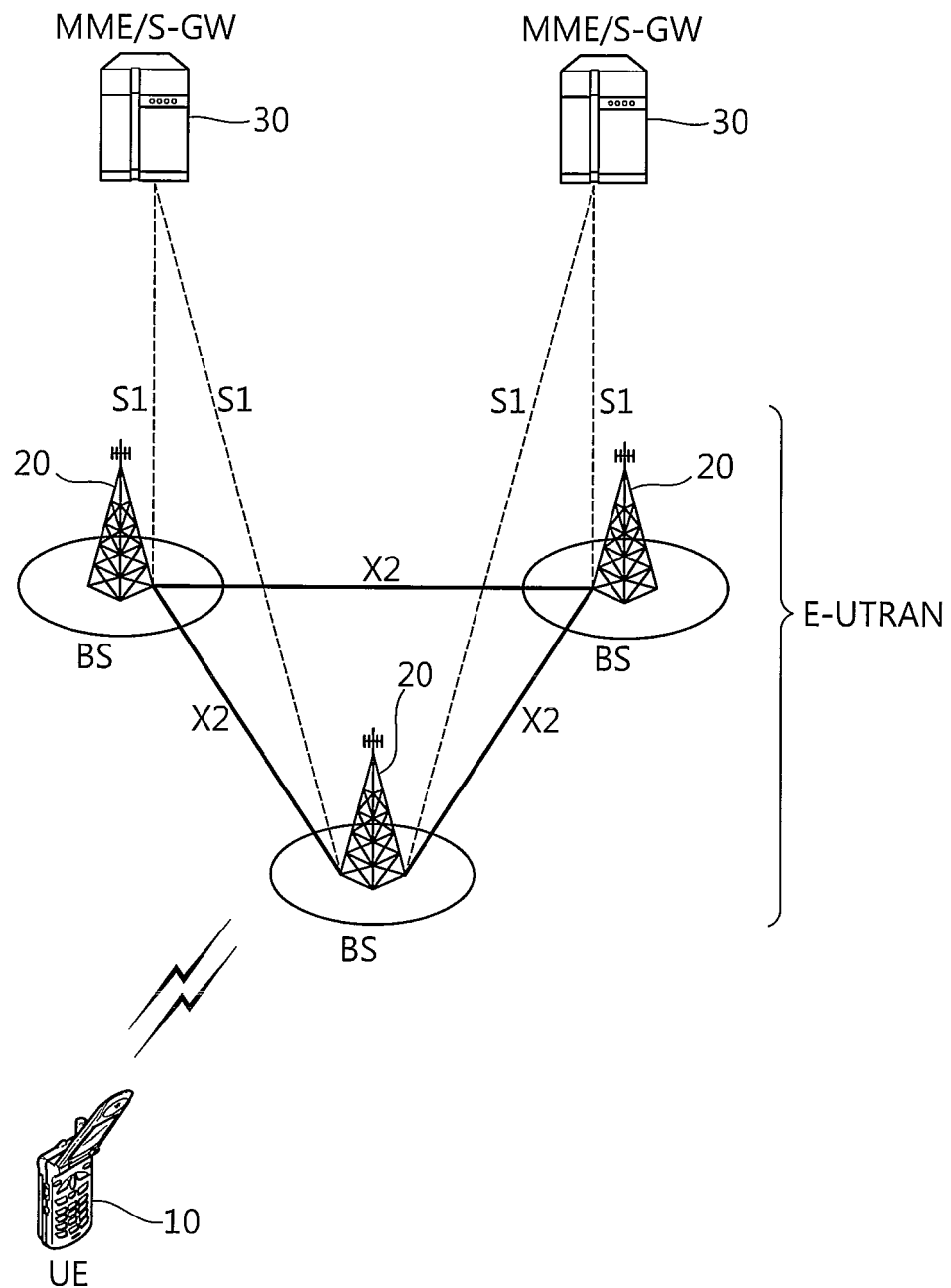
FIG. 1 shows a structure of a wireless communication system.

FIG. 1 shows a structure of a wireless communication system according to an embodiment of the invention. The wireless communication system may have a network structure of an evolved-universal mobile telecommunications system (E-UMTS). The E-UMTS may also be referred to as a long term evolution (LTE) system. The wireless communication system can be widely deployed to provide a variety of communication services, such as voices, packet data, etc.

Referring to FIG. 1, an evolved-UMTS terrestrial radio access network (E-UTRAN) includes at least one base station (BS) 20 which provides a control plane and a user plane.

A user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. Interfaces for transmitting user traffic or control traffic may be used between the BSs 20. Hereinafter, a downlink is defined as a communication link from the BS 20 to the UE 10, and an uplink is defined as a communication link from the UE 10 to the BS 20.

The BSs 20 are interconnected by means of an X2 interface. The BSs 20 are also connected by means of an S1 interface to an evolved packet core (EPC), more specifically, to a mobility management entity (MME)/serving gateway (S-GW) 30. The S1 interface supports a many-to-many relation between the BS 20 and the MME/S-GW 30.

Figure 2:
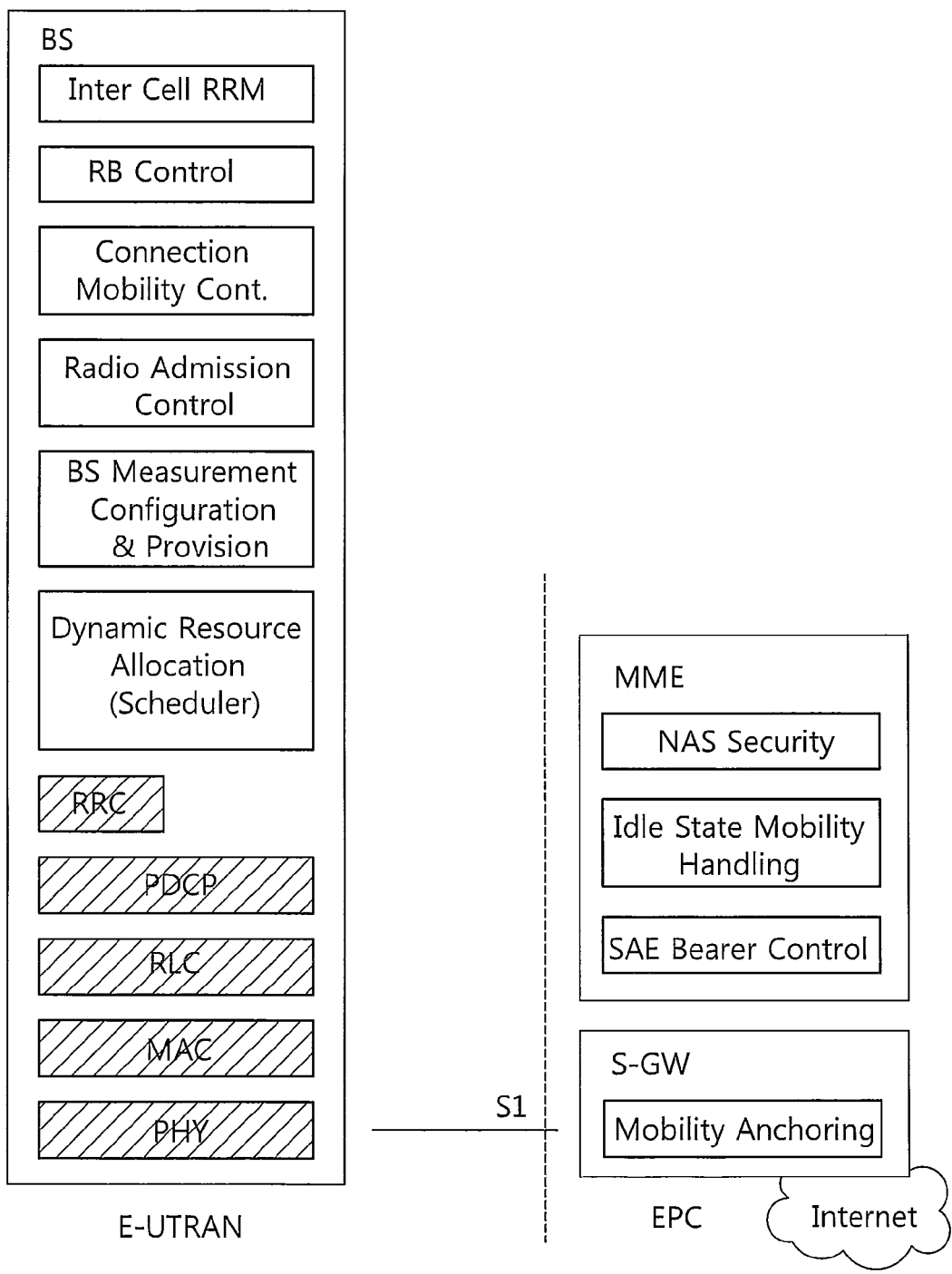
FIG. 2 is a diagram showing functional split between an evolved universal terrestrial radio access network (E-UTRAN) and an evolved packet core (EPC).

FIG. 2 is a diagram showing functional split between the E-UTRAN and the EPC.

Referring to FIG. 2, slashed boxes depict radio protocol layers and white boxes depict functional entities of the control plane.

The BS performs the following functions: (1) functions for radio resource management (RRM) such as radio bearer control, radio admission control, connection mobility control, and dynamic allocation of resources to the UE; (2) Internet protocol (IP) header compression and encryption of user data streams; (3) routing of user plane data to the S-GW; (4) scheduling and transmission of paging messages; (5) scheduling and transmission of broadcast information; and (6) measurement and measurement reporting configuration for mobility and scheduling.

The MME performs the following functions: (1) distribution of paging messages to BSs; (2) security control; (3) idle state mobility control; (4) system architecture evolution (SAE) bearer control; and (5) ciphering and integrity protection of non-access stratum (NAS) signaling.

The S-GW performs the following functions: (1) termination of user plane packet for paging; and (2) user plane switching for the support of UE mobility.

Figure 3:
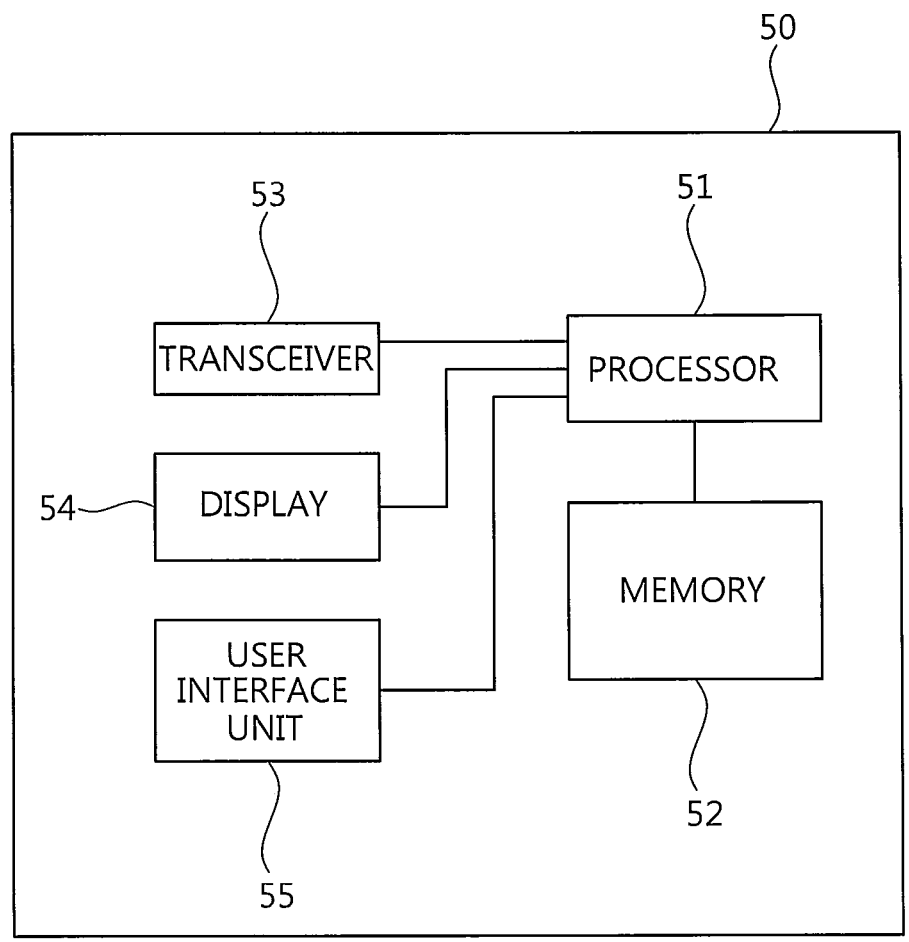
FIG. 3 is a block diagram showing constitutional elements of a user equipment.
Figure 8:
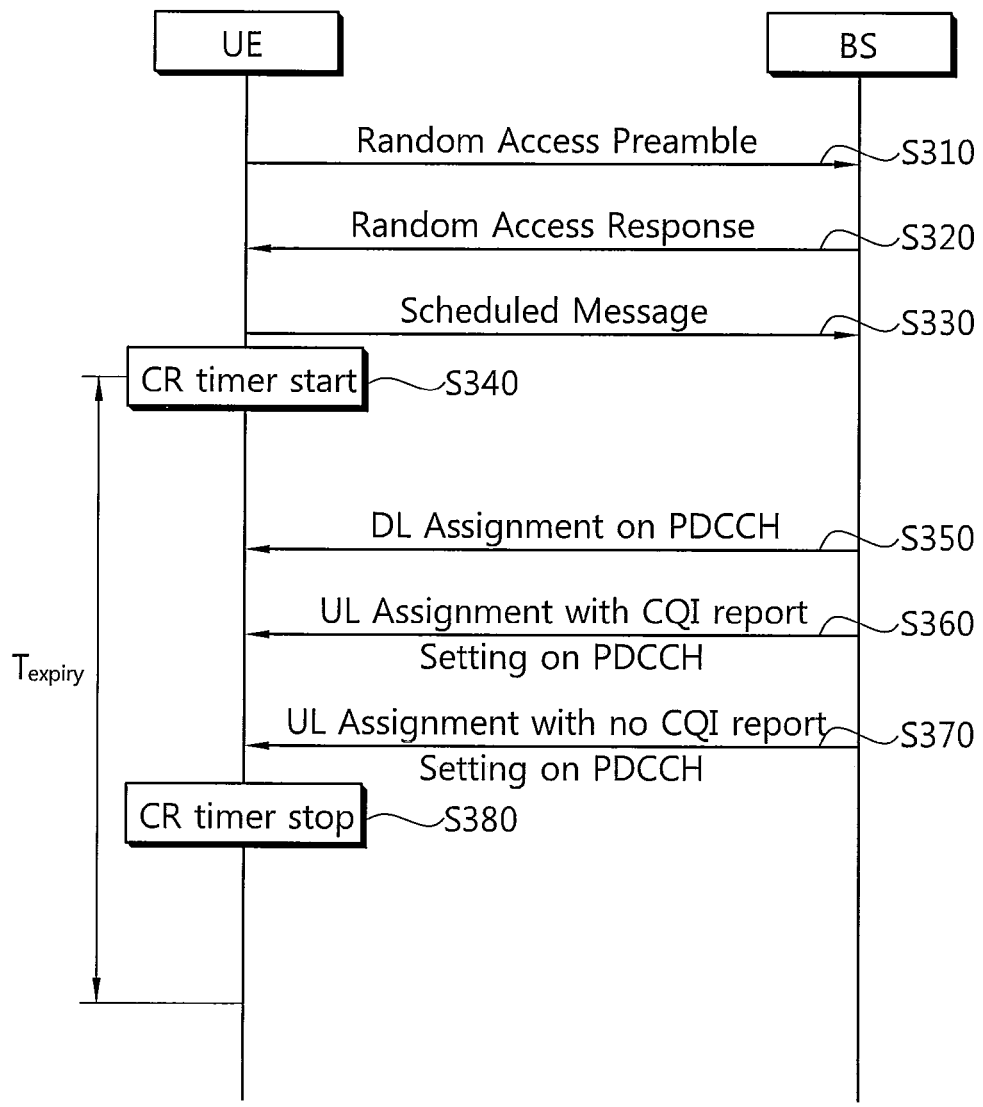
FIG. 8 is a flow diagram showing a contention resolution method when uplink data is transmitted according to an embodiment of the present invention.
Figure 9:
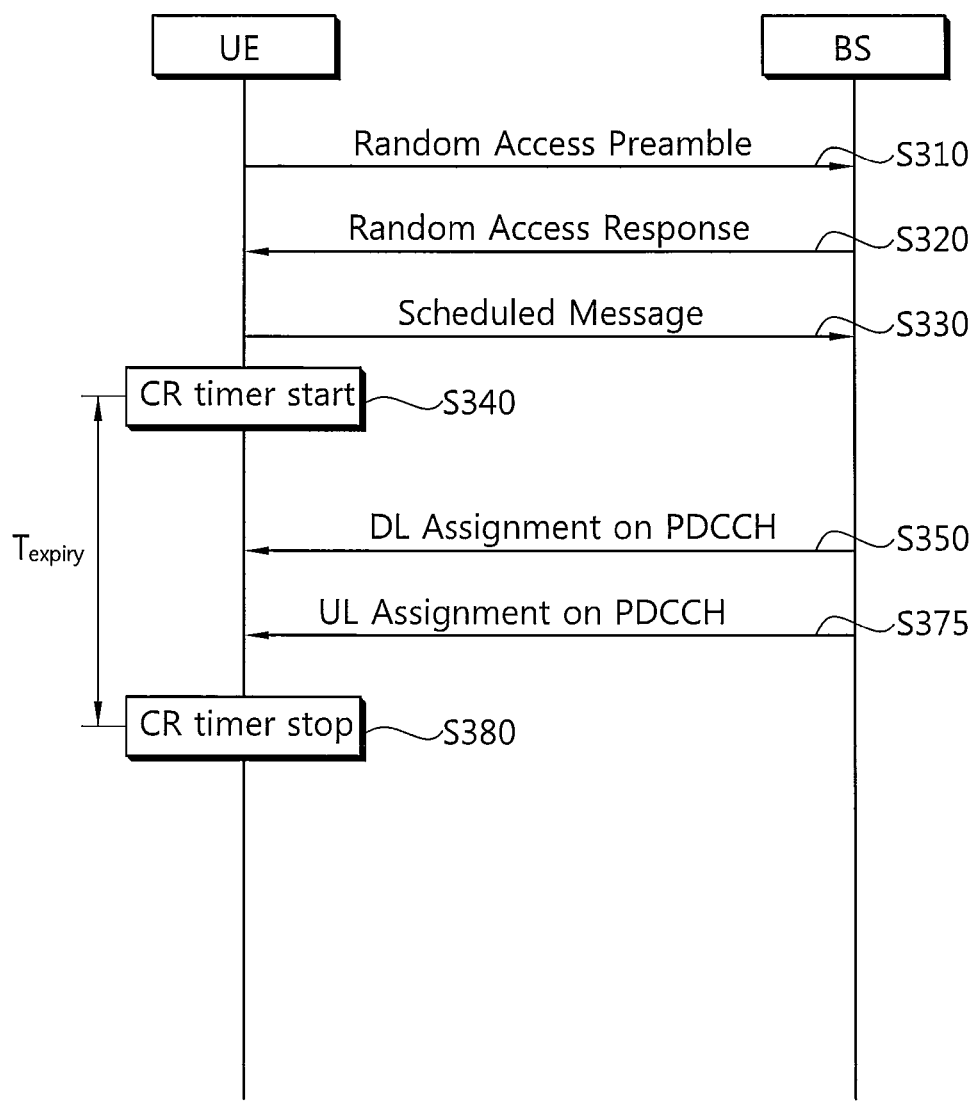
FIG. 9 is a flow diagram showing a contention resolution method when uplink data is transmitted according to another embodiment of the present invention.
Figure 10:
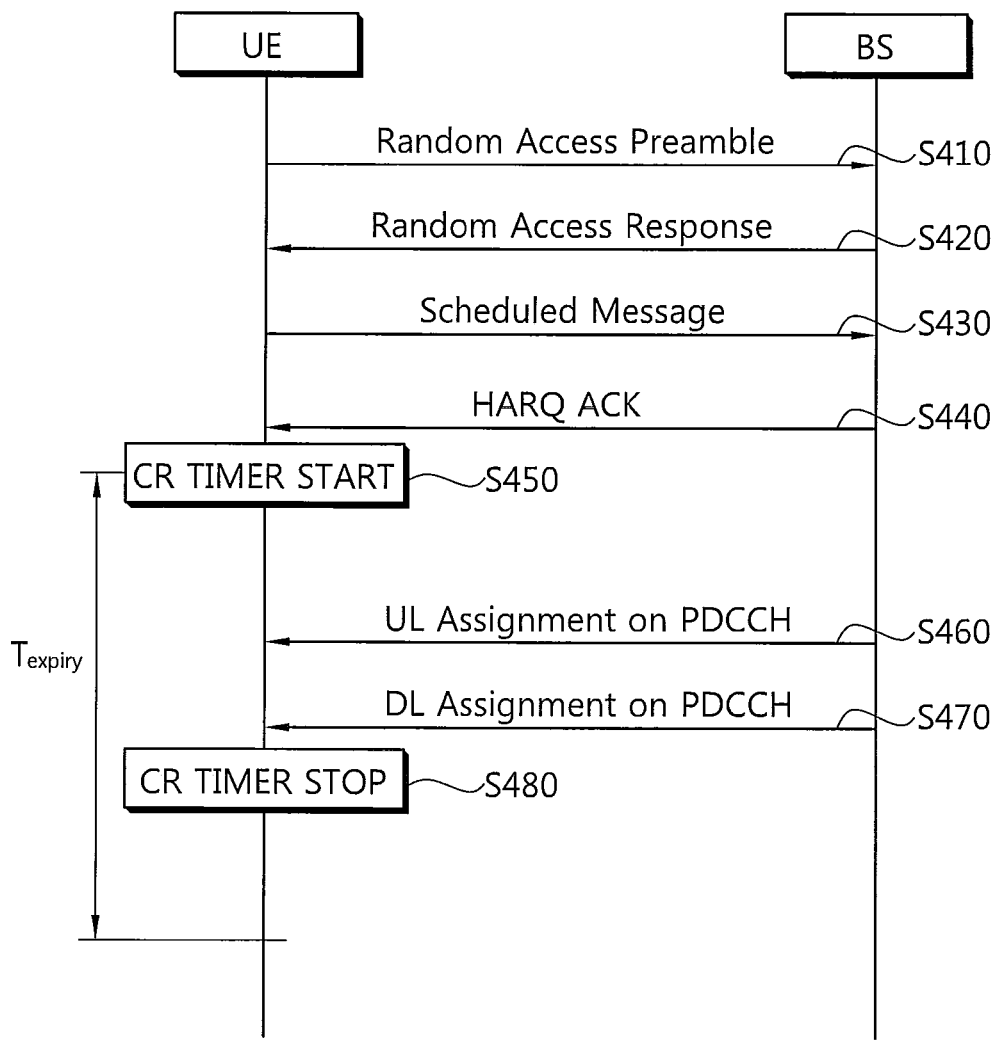
FIG. 10 is a flow diagram showing a contention resolution method when downlink data is transmitted according to an embodiment of the present invention.

FIG. 3 is a block diagram showing constitutional elements of the UE configured to perform the methods shown in FIGS. 8-10. A UE 50 includes a processor 51, a memory 52, a transceiver 53, a display 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. The display 54 displays a variety of information of the UE 50 and may use a well-known element such as a liquid crystal display (LCD), an organic light emitting diode (OLED), etc. The user interface unit 55 can be configured with a combination of well-known user interfaces such as a keypad, a touch screen, etc. The transceiver 53 is coupled to the processor 51 and transmits and/or receives radio signals.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

Figure 4:
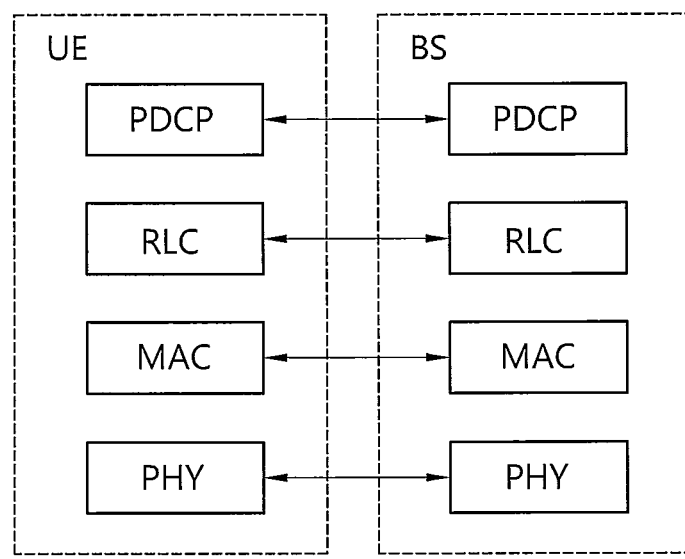
FIG. 4 is a diagram showing a radio protocol architecture for a user plane of a user equipment.
Figure 5:
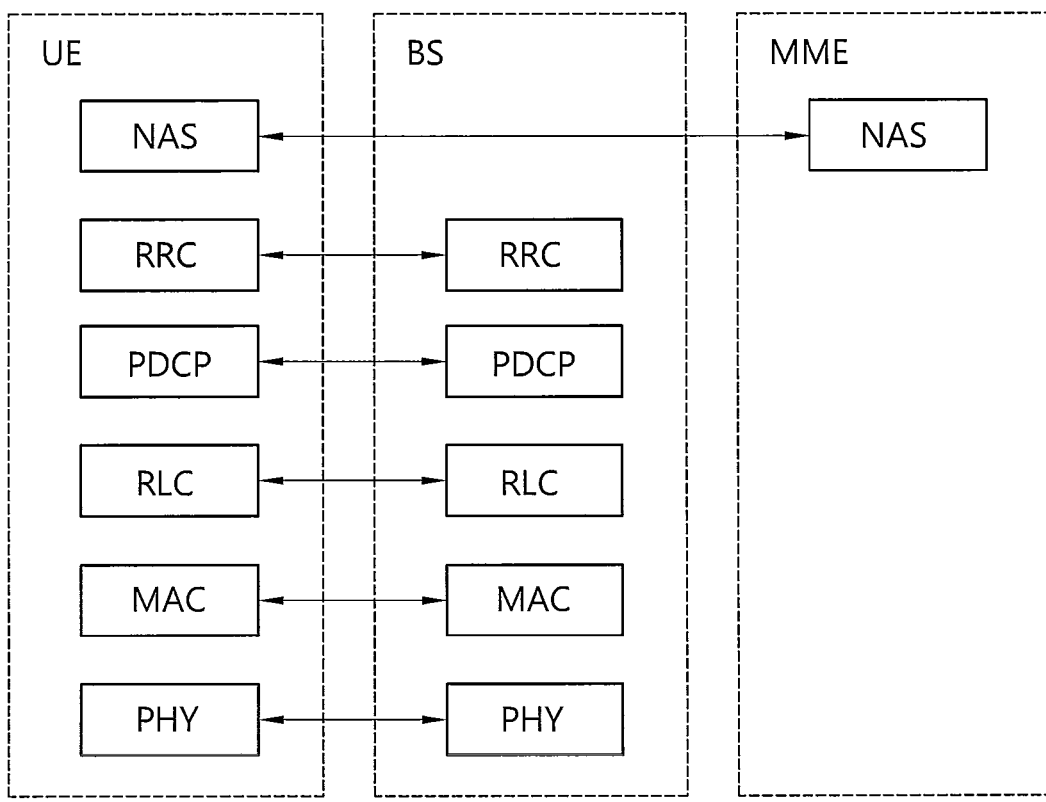
FIG. 5 is a diagram showing a radio protocol architecture for a control plane of a user equipment.

FIG. 4 is a diagram showing a radio protocol architecture for the user plane. FIG. 5 is a diagram showing a radio protocol architecture for the control plane. They illustrate the architecture of a radio interface protocol between the UE and the E-UTRAN. The user plane is a protocol stack for user data transmission. The control plane is a protocol stack for control signal transmission.

Referring to FIGS. 4 and 5, a PHY layer belongs to the first layer and provides an upper layer with an information transfer service through a physical channel. The PHY layer is coupled with a medium access control (MAC) layer, i.e., an upper layer of the PHY layer, through a transport channel. Data is transferred between the MAC layer and the PHY layer through the transport channel. Between different PHY layers (i.e., a PHY layer of a transmitter and a PHY layer of a receiver), data is transferred through the physical channel. In the PHY layer, modulation is performed using an orthogonal frequency division multiplexing (OFDM) scheme and time and frequency can be utilized as a radio resource.

The MAC layer belongs to the second layer and provides services to a radio link control (RLC) layer, i.e., an upper layer of the MAC layer, through a logical channel. The RLC layer in the second layer supports reliable data transfer. There are three operating modes in the RLC layer, that is, a transparent mode (TM), an unacknowledged mode (UM), and an acknowledged mode (AM) according to a data transfer method. An AM RLC provides bidirectional data transmission services and supports retransmission when the transfer of the RLC protocol data unit (PDU) fails.

A packet data convergence protocol (PDCP) belonging to the second layer performs header compression function. When transmitting an Internet protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A radio resource control (RRC) layer belongs to the third layer and is defined only in the control plane. The RRC layer serves to control the logical channel, the transport channel, and the physical channel in association with configuration, reconfiguration and release of radio bearers (RBs). An RB is a service provided by the second layer for data transmission between the UE and the E-UTRAN. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Data is transmitted from the network to the UE through a downlink transport channel. Examples of the downlink transport channel include a broadcast channel (BCH) for transmitting system information and a downlink-shared channel (DL-SCH) for transmitting user traffic or control messages. User traffic of downlink multicast or broadcast service or control messages can be transmitted on the DL-SCH or a downlink multicast channel (MCH). Data is transmitted from the UE to the network through an uplink transport channel. Examples of the uplink transport channel include a random access channel (RACH) for transmitting an initial control message and an uplink-shared channel (UL-SCH) for transmitting user traffic or control message.

Downlink physical channels are mapped to the downlink transport channels. Examples of the downlink physical channels include a physical broadcast channel (PBCH) mapped to the BCH, a physical multicast channel (PMCH) mapped to the MCH, a physical downlink shared channel (PDSCH) mapped to the PCH and the DL-SCH, and a physical downlink control channel (PDCCH) for transmitting control information (e.g., downlink (DL)/uplink (UL) scheduling grant, etc.,) which is provided from the first layer and the second layer. The PDCCH is also referred to as a downlink L1/L2 control channel. Uplink physical channels are mapped to the uplink transport channels. Examples of the uplink physical channels include a physical uplink shared channel (PUSCH) mapped to the UL-SCH, a physical random access channel (PRACH) mapped to the RACH, and a physical uplink control channel (PUCCH) for transmitting control information (e.g., hybrid automatic repeat request (HARQ) acknowledgment (ACK)/negative-ACK (HACK) signals, a scheduling request signal, a channel quality indicator (CQI), etc.,) which is provided from the first layer and the second layer.

Now, a random access procedure will be described. The random access procedure may be performed by a UE for the following purposes: (1) an initial access process; (2) a handover process; (3) a process of transmitting downlink data to a UE that is not time synchronized; (4) a process of transmitting data in uplink by the UE that is not time synchronized; and (5) a recovery process performed when an error occurs in a wireless connection.

Figure 6:
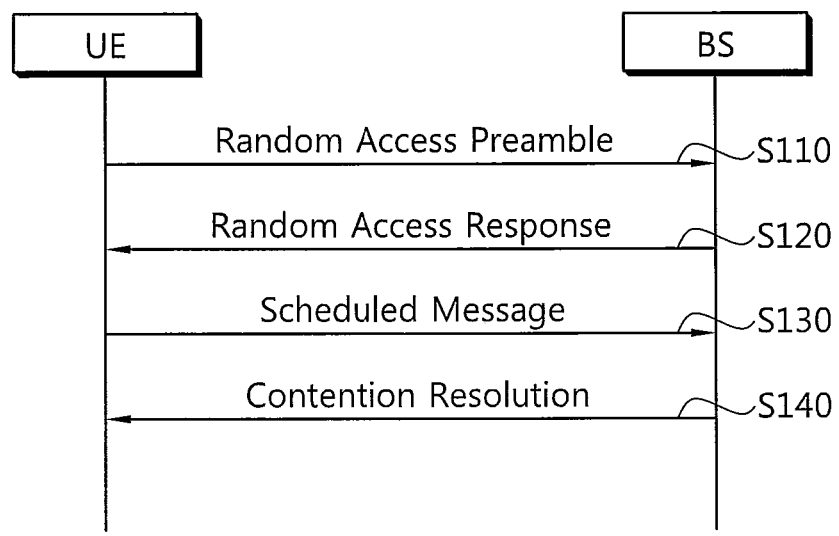
FIG. 6 is a flow diagram showing a conventional random access procedure.

FIG. 6 is a flow diagram showing a conventional random access procedure.

Referring to FIG. 6, a UE transmits a random access preamble to a BS through a selected PRACH resource by using system information received from the BS (step S110). After receiving the random access preamble from the UE, the BS transmits a random access response message through a DL-SCH (step S120). The random access response message includes offset information (i.e., a time advance value) for correcting time synchronization of the UE, uplink radio resource allocation information, index information of the random access preamble received in order to identify UEs performing the random access procedure, and a temporary identifier of the UE. The temporary identifier may be a temporary cell-radio network temporary identity (C-RNTI). After receiving the random access response message, the UE corrects time synchronization according to the random access response message, and transmits a scheduling message including a UE identifier to the BS by using uplink radio resource allocation information (step S130). Herein, the UE identifier may be a C-RNTI, an SAE temporary mobile station identifier (S-TMSI), or a random identifier (Id). After receiving the scheduling message, the BS transmits a contention resolution message to the UE by using the UE identifier transmitted from the UE (step S140).

Now, contention resolution performed in the random access procedure will be described. In the random access procedure, collision may occur because the number of random access preambles is limited. That is, since a BS cannot assign unique random access preambles to all UEs, each UE needs to randomly select one of common random access preambles. Accordingly, in some cases, two or more UEs may select and transmit the same random access preamble by using the same PRACH resource. The BS recognizes the random access preambles as one random access preamble transmitted from one UE, and successfully transmits a random access response message for the random access preamble to the UE. However, since collision has occurred, two or more UEs receive one random access response message, and thus the UEs perform different operations. That is, the UEs transmit different data by using the same radio resource according to uplink radio resource allocation information included in the random access response message. Accordingly, all UEs may fail in data transmission, or only a specific UE may succeed in data transmission according to a location or a transmit power of each UE. When the BS receives data of only the specific UE, the BS has to inform the UEs, which fail in data transmission, of the fact that data transmission has failed. That is, contention resolution is an operation of informing a UE of whether contention is successful or unsuccessful.

There are two conventional contention resolution methods, that is, a first method of using a timer and a second method of transmitting an identifier of a UE which succeeds in contention.

The first conventional method of using the timer is used when the UE already has a unique cell identifier (e.g., C-RNTI) before the random access procedure is performed. According to the first method, the UE which already has its cell identifier transmits data including the cell identifier to the BS according to a random access response message, and then starts a contention resolution timer. If the UE receives the data including the cell identifier through a PDCCH before the timer expires, the UE determines that the UE succeeds in contention and thus successfully finishes the random access procedure. On the contrary, if the UE fails to receive the data including the cell identifier through the PDCCH before the contention resolution timer expires, the UE determines that the UE fails in contention. Then, the UE may re-perform the random access procedure or may provide a failure report to an upper layer.

The second conventional method of transmitting the identifier of the UE which succeeds in contention is used when the UE does not have its unique cell identifier before the random access procedure is performed. According to the second method, if no cell identifier is assigned to the UE, the UE transmits data including an S-TMSI or a random Id which is a higher-level identifier than a cell identifier according to uplink radio resource allocation information included in a random access response, and then starts the contention resolution timer. If the UE receives the data including the higher-level identifier through a DL-SCH before the timer expires, the UE determines that the random access procedure is successful. On the contrary, if the UE fails to receive the data including the higher-level identifier through the DL-SCH before the contention resolution timer expires, the UE determines that the UE fails in contention.

Figure 7:
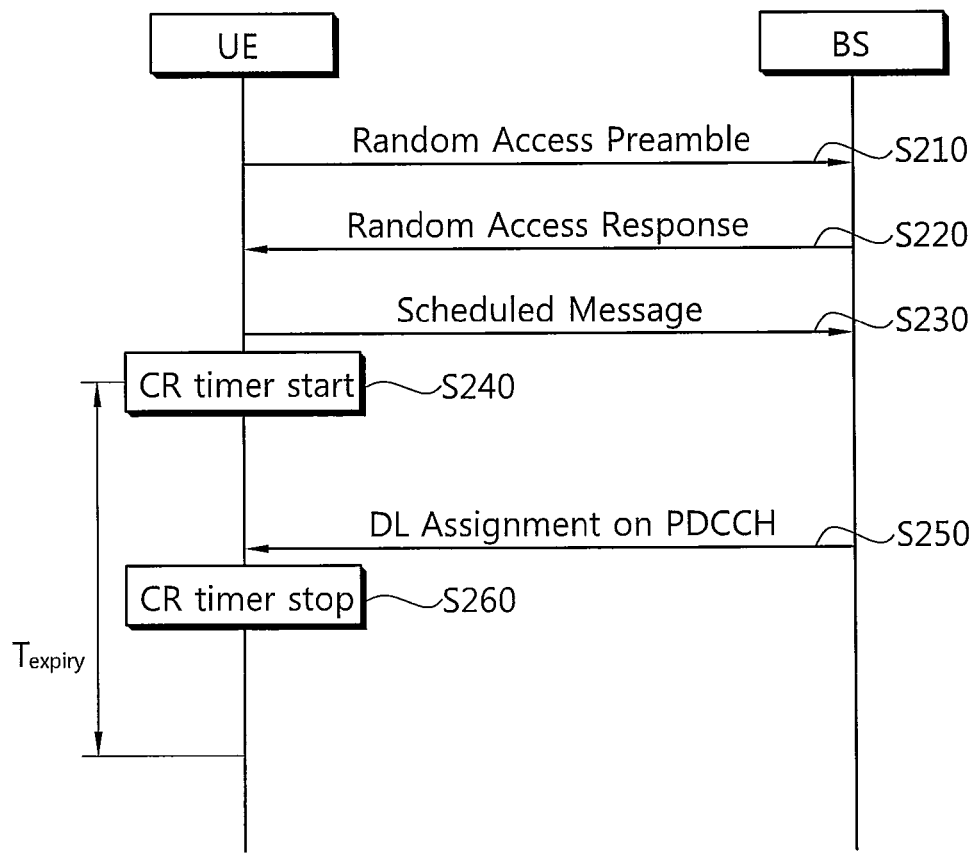
FIG. 7 is a flow diagram for explaining problems which may occur in a conventional contention resolution procedure.

FIG. 7 is a flow diagram for explaining problems which may occur in a conventional contention resolution procedure. It is assumed that a BS is time-synchronized with a UE, and the UE performs a random access procedure upon generation of data to be transmitted in uplink in a situation where no uplink radio resource is allocated from the BS.

Referring to FIG. 7, the UE transmits a randomly selected random access preamble (step S210), and receives a random access response (step S220). If the UE includes a cell identifier, according to uplink radio resource allocation information included in the random access response, the UE transmits a scheduling message including the cell identifier to the BS (step S230), and starts a contention resolution timer (hereinafter, a CR timer) (step S240). If uplink data transmission of the UE fails due to occurrence of collision and if uplink data transmission of another UE is successful, the BS cannot know whether the UE currently performs the random access procedure. In this case, before the CR timer of the UE expires, if the BS transmits downlink radio resource allocation information to the UE through a PDCCH in order to transmit downlink data (step S250), the UE receives another PDCCH which is used for a different purpose from the PDCCH used for contention resolution before the timer expires. Therefore, even through the UE fails in contention due to occurrence of collision, the UE incorrectly determines that the UE succeeds in contention (step S260).

Thus, if the random access procedure was initiated by any conventional PDCCH order and there is a PDDCH transmission addressed to the C-RNTI (e.g., a downlink assignment message, or another conventional PDCCH transmission addressed to the C-RNTI), then the UE considers the contention resolution successful, stops the contention resolution timer, discards the temporary C-RNTI and considers the random access procedure to be successfully completed. However, it is possible in this scenario for the UE to incorrectly determine that the contention resolution was successful (step S260).

To solve the aforementioned problem, the present invention proposes a method in which a control signal is defined by considering a situation, whether contention is successful or unsuccessful is determined only when a specific UL assignment control signal is received under a specific condition, and a UE operates according to the determination result.

Random access may be performed by the UE for the purposes of an initial access process, a handover process, a process of transmitting downlink data to a UE that is not time synchronized, a process of transmitting data in uplink by the UE that is not time synchronized or the UE to which no uplink radio resource is allocated, and a recovery process performed when an error occurs in a wireless connection with the BS.

A control channel is defined according to the purposes of performing the random access. The control channel may be a PDCCH, a DL-SCH indicated by the PDCCH, or the like. A signal transmitted through the DL-SCH may be any one of a MAC layer signal, an RLC layer signal, a PDCP layer signal, an RRC layer signal, and a non-access stratum (NAS) layer signal. A signal transmitted through the PDCCH may be uplink radio resource allocation information or downlink radio resource allocation information. The uplink radio resource allocation information includes a signal for instructing transmission of data by reporting a downlink channel quality indicator (CQI) and a signal for instructing transmission of data without reporting the CQI. In this case, a specific field of the uplink radio resource allocation information may be used to inform whether the UE has to report the CQI by using a radio resource according to the uplink radio resource allocation information. Even if a value of a CQI report request field is not set in the specific field of the uplink radio resource allocation information, the UE may transmit data by including CQI information according to predetermined information.

Now, a method of defining a control signal for contention resolution according to the purposes of performing the random access procedure will be described.

FIG. 8 is a flow diagram showing a contention resolution method when uplink data is transmitted according to an embodiment of the present invention. Herein, a UE intends to transmit data in uplink in a state where no uplink radio resource is allocated from a BS. An RRC connection is established between the UE and the BS. The UE has a cell identifier (C-RNTI) assigned from the BS. A scheduling request channel dedicated to the UE is not established to the UE. Therefore, the UE has to transmit its buffer status report (BSR) to request an uplink (UL) radio resource (e.g., directly from the MAC layer itself). For this, the UE must obtain an UL and therefore performs a random access procedure.

Referring to FIG. 8, the UE transmits a random access preamble (step S310). The random access preamble may randomly be selected from a set of available random access preambles. The UE receives a random access response message for the random access preamble (step S320). Upon successfully receiving the random access response message, the UE transmits a scheduling message (e.g., a buffer status report) by using uplink radio resource allocation information included in the response message (step S330). The scheduling message may include a cell identifier of the UE in the uplink radio resource allocation information. According to transmitting the scheduling message, the UE starts a CR timer (step S340). The CR timer may be started after transmitting the scheduling message. If the UE receives downlink radio resource allocation information through a PDCCH transmission (step S350) or if the UE receives through the PDCCH transmission the uplink radio resource allocation information in which a CQI report indication filed is set (step S360), the UE neither stops the CR timer nor determines whether contention is successful or unsuccessful. Prior to an expiration time $T_{expiry}$ of the CR timer, if the UE receives through the PDCCH the uplink radio resource allocation information in which the CQI report indication field is not set (step S370), the UE stops the CR timer (step S380) and determines that contention is successful.

When receiving, through the PDCCH transmission, the uplink radio resource allocation information in which the CQI report indication field is set, the following description is the reason why the UE neither stops the CR timer nor determines whether contention is successful. In addition to a case where the BS transmits uplink radio resource allocation information according to a radio resource request of the UE, the BS may transmit the uplink radio resource allocation information to the UE at a specific time to instruct CQI reporting. That is, if collision occurs after the CR timer of the UE starts and before the CR timer expires and if the BS does not know that the UE currently performs the random access procedure, the BS may transmit uplink radio resource allocation information through the PDCCH to instruct CQI reporting. In this case, the UE receives the uplink radio resource allocation information through the PDCCH, but the received information is not uplink radio resource allocation information for contention resolution in the random access procedure. For this reason, upon receiving uplink radio resource allocation information in which the CQI report indication field is optionally set, the UE neither determines whether contention is successful nor stops the CR timer.

The UE monitors the PDCCH to detect the identifier of the UE through the PDCCH. Thus, the UE determines whether a control signal is received. If content of the control signal conforms to the purposes of performing the random access procedure, the UE stops the CR timer. Accordingly, incorrect contention resolution resulted from receiving of unintentional control signals can be avoided.

In FIG. 9, if the UE has data in its buffer, the UE triggers a Buffer Status Report (BSR) indicating that there exists data that is ready to be transmitted. However, as in FIG. 8, if a UL is not available to the UE, a UL must be obtained by the UE via a random access procedure. This buffer status initiated random access procedure is an example of a random access procedure that is initiated by the MAC sublayer itself (as opposed to a random access procedure that is initiated by a PDCCH order).

Thus, as in FIG. 8, the UE transmits a random access preamble (step S310). The random access preamble may randomly be selected from a set of available random access preambles. The UE receives a random access response message in reply to the random access preamble (step S320). Upon successfully receiving the random access response message, the UE transmits a scheduling message (e.g., a buffer status report) by using uplink radio resource allocation information included in the response message (step S330). The scheduling message may include a cell identifier of the UE in the uplink radio resource allocation information. According to transmitting the scheduling message, the UE starts a CR timer (step S340). The CR timer may be started after transmitting the scheduling message. If the UE receives downlink radio resource allocation information through a PDCCH transmission (step S350), the UE neither stops the CR timer nor determines whether contention is successful or unsuccessful. Prior to an expiration time $T_{expiry}$ of the CR timer, if the UE receives through the PDCCH the uplink radio resource allocation information (step S375), the UE stops the CR timer (step S380) and determines that contention is successful.

Thus, in FIG. 9, assuming the random access procedure is initiated by the MAC sublayer itself, if the UE receives a PDDCH transmission that is addressed to the C-RNTI of the UE and contains a UL grant for a new transmission by the UE, the UE considers the contention resolution to have been successful, stops the contention resolution timer, discards the temporary C-RNTI and considers the random access procedure to be successfully completed. However, if the random access procedure is initiated by the MAC sublayer itself, and the UE receives a PDCCH transmission addressed to the UE's C-RNTI that does not contain a UL grant (e.g., a downlink assignment as shown in step 350), the UE does not consider the random access procedure to be successful or unsuccessful. That is, the UE does not stop the contention resolution timer and discard the temporary C-RNTI if the random access procedure is initiated by the MAC sublayer itself, and the UE receives a PDCCH transmission addressed to the UE's C-RNTI that does not contain a UL grant.

FIG. 10 is a flow diagram showing a contention resolution method when downlink data is transmitted according to an embodiment of the present invention. Downlink data to be received by a UE is generated in a state where the UE is not time synchronization with a BS. An RRC connection is not established between the UE and the BS. The UE has a cell identifier assigned from the BS. The BS instructs the UE to perform a random access procedure to receive downlink data, and then the UE performs a contention-based random access procedure.

Referring to FIG. 10, the UE transmits a random access preamble (step S410). The random access preamble may randomly be selected from a set of available random access preambles. The UE receives a random access response message for the random access preamble (step S420). Upon successfully receiving its random access response message, the UE transmits a scheduling message by using uplink radio resource allocation information included in the response message (step S430). The scheduling message may include a cell identifier of the UE in the uplink radio resource allocation information. The scheduling message may be transmitted using a hybrid automatic repeat request (HARQ). The UE receives an HARQ ACK (step S440), and then starts a CR timer (step S450). If the UE receives uplink radio resource allocation information through a PDCCH (step S460), the UE neither stops the CR timer nor determines whether contention is successful or not. If the UE receives downlink radio resource allocation information through the PDCCH prior to an expiration time $T_{expiry}$ of the CR timer (step S470), the UE stops the CR timer (step S480) and determines that contention is successful. Alternatively, if the UE receives through the PDCCH the uplink radio resource allocation information in which a CQI report indication field is set, the UE may stop the CR timer and may determine contention is successful. After stopping the CR timer, the UE may receive a contention resolution message.

In addition, if a contention-based random access is performed in a handover procedure, similarly to the case of transmitting uplink data, the UE stops the CR timer and determines that contention is successful only when uplink radio resource allocation information is received while the CR timer is running. The uplink radio resource allocation information may be limitedly used only when a CQI indication report is not set. The uplink radio resource allocation information may also be used when the CQI indication report is set.

If the UE stops the CR timer and determines that contention is successful in all cases where a message including the cell identifier of the UE is received through the PDCCH before the CR time expires, there is a high possibility that the determination is wrong. Therefore, it is preferable that the UE stops the CR timer and determines that contention is successful only when radio resource allocation information defined according to the purposes of performing the random access procedure is received.

Since a control signal used for contention resolution is defined by considering a situation in the contention-based random access procedure, it is possible to prevent a case where a UE wrongly determines whether contention is successful and performs an incorrect operation related to the wrong determination. Therefore, it is possible to solve a problem in which transfer interference of another UE occurs caused by incorrect contention resolution and in which a delay time increases due to error recovery.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed:

1. A method of performing contention resolution associated with a random access procedure between a mobile communication terminal and a base station, the method comprising:
   transmitting, by the mobile communication terminal, a random access preamble;
   receiving, by the mobile communication terminal, a random access response;
   transmitting, by the mobile communication terminal, an uplink message containing a cell-radio network temporary identity (C-RNTI) and starting a contention resolution timer once the uplink message is transmitted; and
   receiving, by the mobile communication terminal, a physical downlink control channel (PDCCH) transmission;
   wherein the mobile communication terminal considers a contention resolution successful and stops the contention resolution timer if the PDCCH transmission is addressed to the C-RNTI and the random access procedure is initiated by a downlink (DL) data arrival, and
   wherein the mobile communication terminal considers the contention resolution successful and stops the contention resolution timer if the PDCCH transmission is addressed to the C-RNTI and contains an uplink (UL) grant.

2. The method of claim 1, wherein the random access procedure is initiated by a PDCCH order, which is associated with the DL data arrival.

3. The method of claim 1, wherein the random access procedure is initiated by an uplink data arrival.

4. The method of claim 1, wherein the C-RNTI is contained in the uplink message as a medium access control (MAC) control element.

5. A mobile communication terminal comprising:
   a transceiver; and
   a processor performing contention resolution associated with a random access procedure and configured to:
   transmit a random access preamble,
   receive a random access response,
   transmit an uplink message containing a cell-radio network temporary identity (C-RNTI) and starting a contention resolution timer once the uplink message is transmitted, and
   receive a physical downlink control channel (PDCCH) transmission,
   wherein the mobile communication terminal considers a contention resolution successful and stops the contention resolution timer if the PDCCH transmission is addressed to the C-RNTI and the random access procedure is initiated by a downlink (DL) data arrival, and
   wherein the mobile communication terminal considers the contention resolution successful and stops the contention resolution timer if the PDCCH transmission is addressed to the C-RNTI and contains an uplink (UL) grant.

6. The mobile communication terminal of claim 5, wherein the random access procedure is initiated by a PDCCH order, which is associated with the DL data arrival.

7. The mobile communication terminal of claim 5, wherein the random access procedure is initiated by an uplink data arrival.

8. The mobile communication terminal of claim 5, wherein the C-RNTI is contained in the uplink message as a medium access control (MAC) control element.

* * * * *